United States Patent

Lynch et al.

[11] 3,930,666
[45] Jan. 6, 1976

[54] HYBRID GAS SYSTEM FOR AUTOMOBILE PASSENGER RESTRAINT SYSTEM

[75] Inventors: Robert W. Lynch, Fountain Valley, Calif.; Vincent O. Catanzarite, Las Vegas, Nev.

[73] Assignee: Specialty Products Development Corporation, Oak Creek, Wis.

[22] Filed: May 1, 1974

[21] Appl. No.: 465,838

[52] U.S. Cl. .............. 280/150 AB; 23/281; 102/40; 222/3; 285/390
[51] Int. Cl.² ........................................ B60R 21/08
[58] Field of Search..... 280/150 AB; 23/281; 222/3, 222/5, 572; 102/39, 40; 285/177, 390

[56] References Cited
UNITED STATES PATENTS

| | | | |
|---|---|---|---|
| 3,089,418 | 5/1963 | Stiefel | 102/39 |
| 3,089,419 | 5/1963 | Pollard | 102/39 |
| 3,163,014 | 12/1964 | Wismar | 23/281 X |
| 3,183,021 | 5/1965 | Rickard | 285/390 X |
| 3,642,304 | 2/1972 | Johnson et al. | 280/150 AB |
| 3,649,045 | 3/1972 | Smith et al. | 280/150 AB |
| 3,663,036 | 5/1972 | Johnson | 280/150 AB |
| 3,674,059 | 7/1972 | Stephenson | 102/39 X |
| 3,680,896 | 8/1972 | Cupit | 285/177 |
| 3,711,115 | 1/1973 | Lohr | 280/150 AB |
| 3,813,007 | 5/1974 | Doin et al. | 23/281 |

*Primary Examiner*—Leo Friaglia
*Assistant Examiner*—John P. Silverstrim
*Attorney, Agent, or Firm*—Christie, Parker & Hale

[57] ABSTRACT

A hybrid system is described for inflating an automobile passenger restraint bag. Part of the gas for inflating the bag is stored in a high pressure gas reservoir. Another portion is generated by combustion of a pyrotechnic mixture. In a preferred embodiment the gas storage cylinder and pyrotechnic generator are coaxial with an axial gas flow passage through the pyrotechnic generator for collecting and conveying gas. A frangible diaphragm separates the pyrotechnic gas generator from the high pressure gas storage vessel. The gas generator has four compartments surrounding the gas flow passage, each containing a pyrotechnic gas generator grain. Combustion gas flows from one of these compartments through another and thence to the axial gas passage. In each embodiment the two inflation gas sources are in series with the inflatable bag rather than in parallel with each other.

6 Claims, 8 Drawing Figures

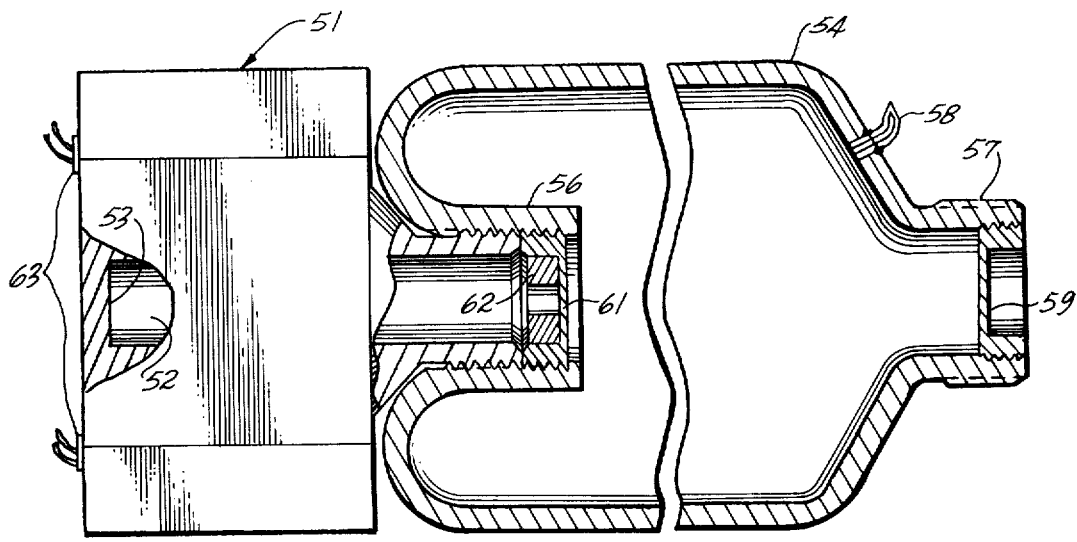
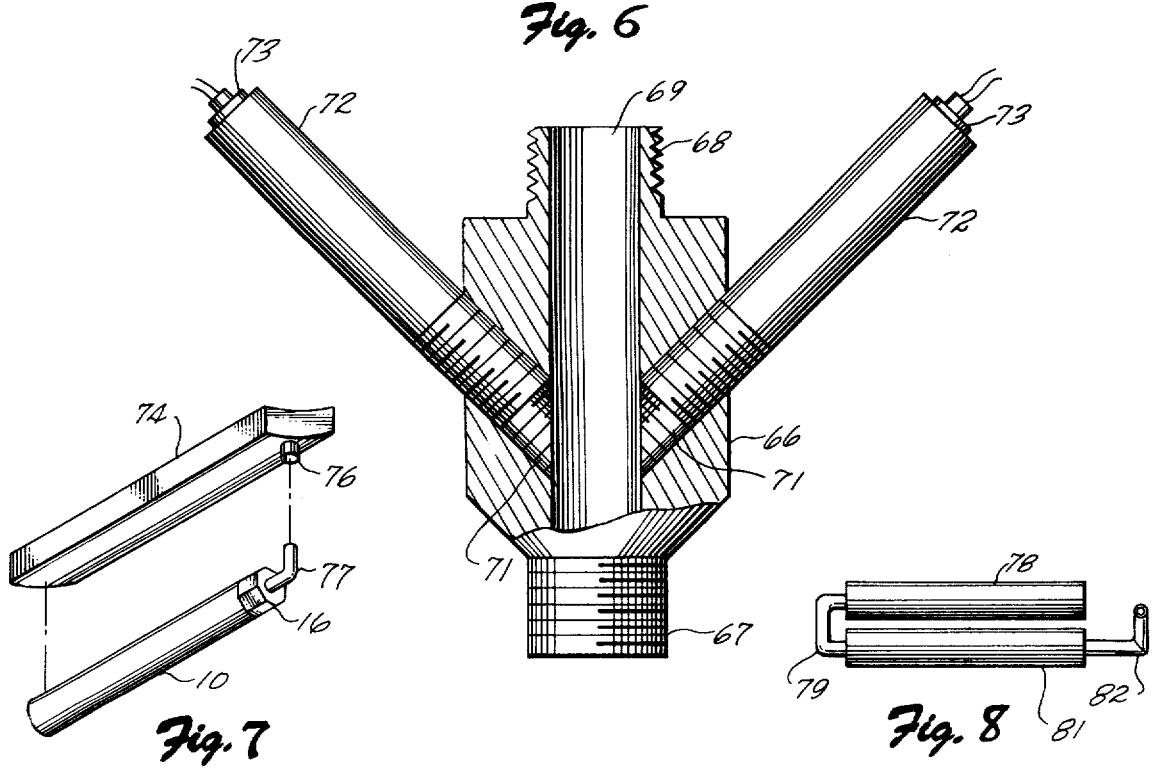

HYBRID GAS SYSTEM FOR AUTOMOBILE PASSENGER RESTRAINT SYSTEM

BACKGROUND OF THE INVENTION

Government regulations for automobile passenger restraint systems appear to be headed in the direction of requiring an inflatable bag that momentarily and temporarily restrains a passenger during the critical instant of a collision impact. For safe and successful use the bag must be inflated in a very short time and thereafter deflated to release the passenger. The gas used to inflate the bag must be cooled enough to avoid damage to the bag and injury to the passenger. The gases used must also have a low toxicity.

Such a passenger restraint system must be installed in the automobile at the time it is built and may remain unused for a period of several years and still be ready for instant operation in case of a collision. The system should be economical since large numbers of installations are required and a significant economic impact results from relatively small changes in cost. Both cost and reliability considerations dictate a system with relatively low complexity. In addition, such a system must be stored behind the dashboard of the car until ready for use and a minimum volume is therefore essential.

There are three basic types of inflation systems for automobile passenger restraint bags. One of these has a sufficient supply of inflation gas stored under elevated pressure in a vessel that is opened at the moment of impact. In a collision such vessels may be opened explosively so that the pressurized gas is rapidly available. The adiabatic cooling of the gas as it expands from elevated pressure to the nearly ambient pressure of the inflatable bag introduces a severe chill and also reduces the effective volume of the gas available for inflating the bag.

Another technique employs a pyrotechnic gas generator wherein a rapidly burning composition produces substantial volumes of hot gas which are then directed into the inflatable bag. Some compositions are available with sufficiently low temperature of the combustion gas that it can be directed substantially directly into the bag without danger to the passenger. Other systems produce sufficiently high temperature gas that means must be used for cooling the gas before it is introduced in the bag. Various endothermic compositions, heat absorbing baffles, and the like have been devised for cooling the gas. However, these usually introduce substantial complexity into the system.

The third type of passenger restraint bag inflation system is a "hybrid" in that both a supply of gas under elevated pressure and a pyrotechnic gas generator are used. The gas from these two sources is mixed prior to inflating the bag and the high temperature of the combustion gas offsets the adiabatic cooling of stored gas to enhance gas volume and provide inflation gas at any desired temperature. In some such systems the pyrotechnic gas generator produces a rather small volume of gas but provides considerable energy for warming the gas from the high pressure gas storage vessel. This invention concerns a hybrid gas generation system.

Hybrid systems have an inherent complexity due to having two separate gas supplies. They also have tended to have a rather large volume and complex geometry in attempts to satisfy the safety and reliability requirements of the two systems. This has made it difficult to adapt the hybrid systems to practical installation in automobiles. One problem with hybrid gas generation systems has been that the pyrotechnic gas generator is often placed within the gas pressure reservoir so that the gas is mixed before leaving the reservoir. Pyrotechnic gas generators are initiated by an electrical signal which must be conveyed into the gas storage reservoir. Since the reservoir must hold the gas for a long period of time with high reliability, there are significant problems with long term sealing around the connectors leading the electrical wires into the reservoir. Such an arrangement also requires that the pyrotechnic gas generator be in place before the reservoir is filled and before it is sealed. The presence of the pyrotechnic material within the gas reservoir can limit the available techniques for sealing the reservoir thereafter. If the gas generator is external to the storage reservoir plenums are needed for mixing the gases before discharge into the inflatable bag. Such additional "plumbing" complicates the design and makes a bulky system that is difficult to fit into a car.

It is therefore desirable to have a hybrid gas system for an automobile passenger restraint bag that has a minimum volume and "clean" shape so that it can be readily fitted behind the dash of an automobile without extensive modification. Such a system should be reliable and economical and sufficiently sturdy to withstand the temperatures and pressures involved in operation.

BRIEF SUMMARY OF THE INVENTION

There is, therefore, provided in practice of this invention according to a presently preferred embodiment a hybrid inflation system for a passenger restraint bag in the form of a high pressure gas storage reservoir sealed by a frangible diaphragm over a gas flow orifice located in one end of the reservoir. A pyrotechnic gas generator outside the reservoir is connected thereto and has gas flow passage separated from the high pressure gas by the frangible diaphragm. Gas from one of these sources flows through the other enroute to the bag for thorough mixing without an additional plenum. Such a serial arrangement has a minimum volume and an efficient external geometry.

A preferred pyrotechnic gas generator has a pressure resistant housing with an axial gas flow passage open at both ends for flow therethrough. Several cavities spaced around the axial passage in the housing have pyrotechnic compositions ignited by an electrical initiator for generating gas. Gas flows from a first one of these cavities through a transverse passage to a second and thence through a transverse duct to the axial gas flow passage. A preferred cylindrical gas storage reservoir has an inverted axial neck for close coupling to the pyrotechnic gas generator.

DESCRIPTION OF THE DRAWINGS

These and other features and advantages of the present invention will be appreciated as the same becomes better understood by reference to the following detailed description of a presently preferred embodiment when considered in connection with the accompanying drawings wherein:

FIG. 5 illustrates in partial longitudinal cross section another embodiment of hybrid gas generation system constructed according to principles of this invention;

FIG. 6 illustrates in longitudinal cross section another embodiment of pyrotechnic gas generator;

FIG. 7 illustrates in exploded perspective the system of FIG. 1 and its associated bag inflation manifold; and FIG. 8 illustrates in plan view another embodiment of bag inflation system.

DESCRIPTION

Figure 1:
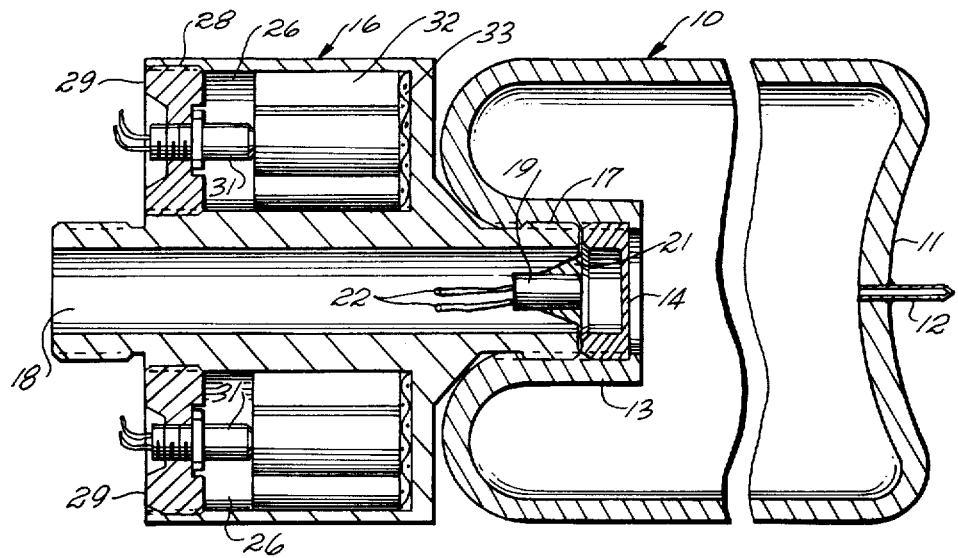
FIG. 1 illustrates in longitudinal cross section a hybrid gas generation system constructed according to principles of this invention.

FIG. 1 illustrates in longitudnial cross section a presently preferred hybrid gas generator for inflating an automobile passenger restraint bag. High pressure gas (2300 psi) such as nitrogen or argon is stored in a cylindrical steel pressure vessel 10 having a conventional pressure dome 11 at one end. Typically the volume of the tank is about 100 cubic inches. A steel tube 12 passes through the dome and is welded in place for filling the gas storage reservoir. After filling with pressurized gas the tube 12 is pinched off and welded shut to permanently store the gas in the reservoir.

At the opposite end of the gas storage reservoir 10 is an inverted neck 13 extending into the tank rather than extending out from the end as is more common. A female thread within the neck accepts a conventional frangible diaphragm 14. After the diaphragm is threaded in place, it is preferred to electron beam weld around the threads to assure a permanent gas tight seal. With all openings to the tank welded shut, it is assured that the gas within the reservoir is maintained at elevated pressure for the very long periods of time required in an automobile passenger restraint system. By having an inverted neck within the tank with connections made thereto by the female thread, an appreciable volume saving can be achieved since the overall length of the tank and its appurtenant connector is substantially reduced.

A pyrotechnic gas generator 16 has a male thread 17 threaded into the female thread in the inverted neck of the gas storage reservoir. The gas generator is machined from a single piece of steel to give it substantial pressure resistance and is made as short as feasible for minimum volume. The gas generator has a generally square shape with deeply chamfered corners, giving it an octagonal cross-section, the maximum dimension of which is approximately the same as the diameter of the gas storage reservoir. By having the cross-section of the generator substantially the same as that of the tank, the envelope in which the hybrid system must be fitted can be minimized. The generator has an axial gas flow passage 18 coaxial with the neck 13 of the storage reservoir. A threaded male connector 20 at the opposite end of the axial gas flow passage permits attachment to the inflation manifold for the restraint bag.

A conventional explosive actuator or detonator 19 is positioned in the axial gas flow passage by a light conical bracket 21. The lead wires 22 from the actuator pass through a diagonal passage 23 in the housing to a conventional pressure resistant electrical lead-through 24. It should be noted that the lead-through 24 can be simply threaded into the diagonal passage 23 with a nominal seal since it is not necessary to store pressurized gas therein for any period of time. The feed-through and other closures in the gas generator are subjected to pressure for only small fractions of a second during operation and no special means need be taken for long-term sealing. The only seals of long-term importance in a system as provided in practice of this invention are those around the burst diaphragm 14 and fill tube 12 of the gas storage reservoir.

The gas generator 16 has four cavities extending in a longitudinal direction parallel to the axis of the axial gas flow passage 18. Since these cavities are in similar pairs, only one pair 26 and 27 of the cavities is described in detail. The four cavities are symmetrically placed around the axial passage to occupy the least volume in the housing and still leave space for various internal passages hereinafter described and the diagonal passage 23 mentioned above.

The cavity 26 is closed at its end adjacent the storage reservoir and open at its opposite end. Threads 28 in the open end of the cavity accept a plug 29 in which a conventional electrical initiator or igniter 31 is threaded. The end of the initiator butts against the end of a conventional gas generator grain 32. A piece of expanded metal 33 separates the grain from the closed end of the cavity. The gas generator grain is somewhat resilient, and it is firmly held in position by the expanded metal and the initiator. If preferred, the grains can be adhesively bonded in place in the cavities.

The other cavity 27 in each pair is also closed at the end nearest the gas storage reservoir and open at its opposite end. A threaded plug 34 closes the cavity and engages a piece of expanded metal 36 within the cavity. Another somewhat longer propellant grain 37 substantially fills the balance of the cavity 27 and is spaced from the closed end thereof by a central boss 38.

Figure 2:
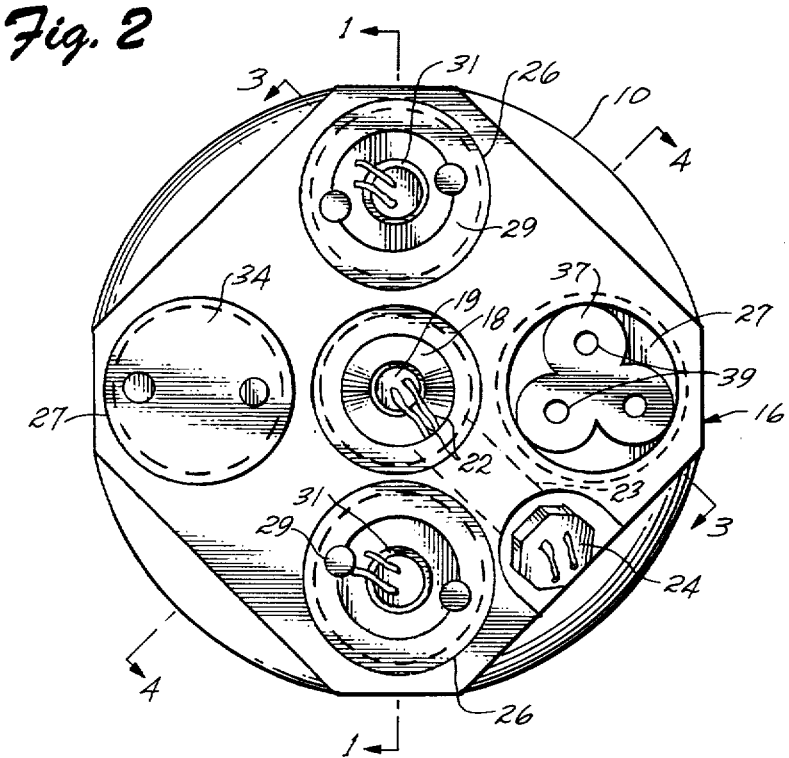
FIG. 2 is an end view from the gas generator end of the hybrid system.

Each of the propellant grains 32 and 37 is a conventional solid pyrotechnic composition which burns rapidly upon initiation to produce substantial volumes of non-toxic gas. A variety of such solid pyrotechnic mixtures are available. Each grain is in the form of a three lobe coverleaf as seen in FIG. 2 where one of the plugs 34 has been removed. Three longitudinal holes 39 extend along the length of the grain. This geometry keeps the web thickness of the grain down and provides a substantial surface area so that rapid and uniform burning is obtained. Burning proceeds on the external surface and also the surfaces inside the holes. As the external surface reduces, the area within the holes increases apace so that the gas production rate remains constant.

Figure 3:
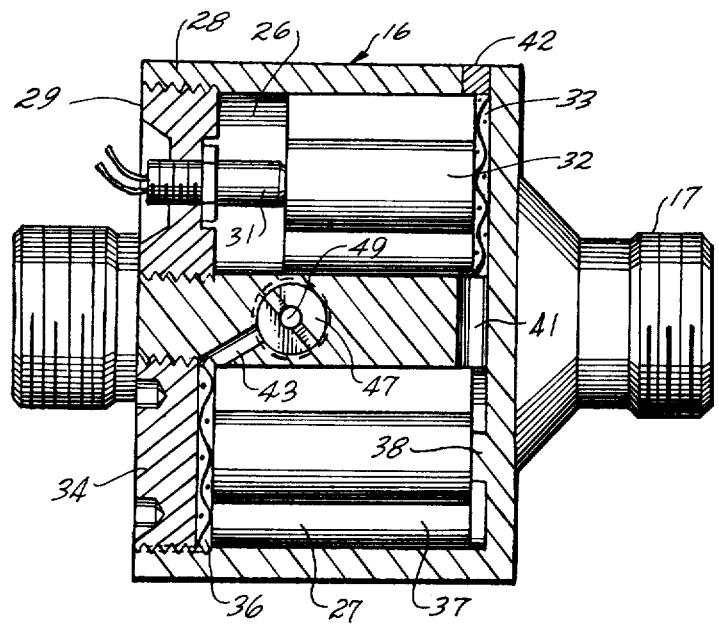
FIG. 3 is a longitudinal cross section of the gas generator at line 3—3 in FIG. 2.

As seen in FIG. 3 a transverse passage 41 extends between the blind ends of the cavities 26 and 27 of the pair. Such a passage 41 can be made, for example, by drilling through from one side and subsequently welding a plug 42 in the side of the pressure resistant housing of the gas generator. Another manufacturing technique is to bring a flycutter down into each cavity of the pair and cut laterally towards the other to provide an opening therebetween. The size and shape of the transverse passage 41 is unimportant, and, as appears hereinafter, is solely for relatively unrestricted gas flow between the cavities during operation.

A short diagonal passage 43 extends from the region in the second cavity 27 occupied by the expanded metal 36 to a transverse duct 44. The duct 44 is threaded throughout its length and closed at its outer end by a plug 46. The inner end of the duct 44 communicates with the axial gas flow passage 18 through the gas generator. A threaded insert 47 is in the inner end of the duct and includes a sealing cup 48 across an orifice 49 through the insert.

The other pair of cavities 26 and 27 has similar structure, appurtenances and gas passages.

When the passenger restraint system senses a collision impact, an electrical signal is sent by way of the lead wires 22 to the explosive detonator 19. The explosive pressure pulse from the detonator ruptures the frangible diaphragm 14, thereby releasing gas from the axial exit orifice of the gas storage reservoir 10. The gas flows through the axial passage 18 of the gas generator and thence to a passenger restraint bag (not shown).

An electrical signal is also applied to each of the igniters 31 to also cause them to fire. This ignites the first propellant grain 32 and combustion gas from it in turn ignites the second propellant grain 37. The gas from the first propellant grain 32 passes through the transverse passage 41 between the chambers 26 and 27. The expanded metal 33 at the blind end of the cavity 26 and the boss 38 in the cavity 27 keep the respective grains off of the blind end walls and permit gas flow.

Gas from the two propellant grains as they burn passes through and around the expanded metal 36 at the end of the second cavity 27 and thence through the short diagonal passage 43 into the duct 44. The increased pressure in the duct blows out or ruptures the cap 48 in the insert 47 and the combustion gases flow through the orifice 49 into the axial gas flow passage through the generator. This serial flow causes the relatively hot combustion gas to mix with the relatively cool expanding gas from the storage reservoir to reach some mean temperature before reaching the inflatable passenger restraint bag and avoids any need for an additional mixing plenum.

Figure 4:
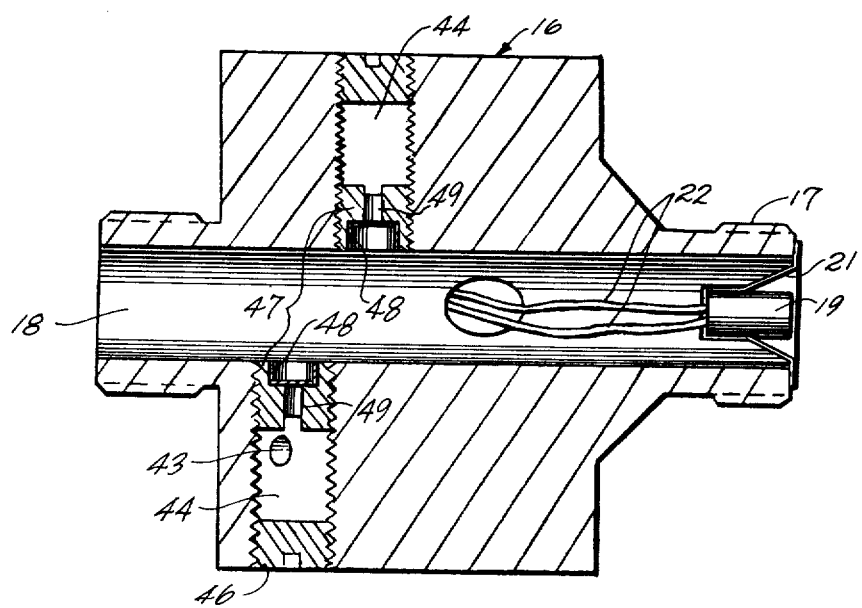
FIG. 4 is a longitudinal cross section of the gas generator at line 4—4 in FIG. 2.

It will be noted that the two ducts 44 from the separate pairs of cavities are staggered from each other (FIG. 4) so that the orifice 49 are not aligned. This reduces interference between the combustion gases ejected therefrom and promotes better mixing with the expanding gas from the reservoir.

The hybrid system as provided in FIGS. 1 to 4 has an advantage that, if desired, either the gas from the reservoir 10 or the gas from the pyrotechnic generator 16 may be used for inflation to the exclusion of the other. Such a technique may be used where two level bag inflation is desired. This may be advantageous if one wishes to inflate the passenger restraint bag to a relatively lower pressure for minor collisions and to a rather higher pressure in case of a major crash.

Proportionately less inflation can be obtained, for example, by firing the explosive detonator 19 and dumping the contents of the pressurized gas storage reservoir 10 in the bag without addition of gas from the pyrotechnic generator. On the other hand, one may wish to fire the initiators 31 and obtain the pyrotechnic gas without rupturing the diaphragm 14 and mixing with the pressurized gas. This leaves the added option of employing both the pressurized gas and the pyrotechnic gas in case of a major impact.

FIG. 5 illustrates another embodiment of hybrid gas generation system constructed according to principles of this invention. As illustrated in this embodiment, a pyrotechnic gas generator 51 is used which is substantially similar to that hereinabove described except for the differences illustrated in FIG. 5. In this gas generator the axial gas flow passage 52 is closed at its end 53 remote from the pressurized gas storage vessel 54. At its opposite end the gas generator 51 is threaded into an inverted neck 56 of the gas storage reservoir 54 in the same manner as hereinabove described.

The gas reservoir in this embodiment differs from that of FIG. 1 in that there is a male neck 57 at the opposite end from the gas generator. A gas filling tube 58 as hereinabove described is used for pressurizing the tank 54.

The male neck 56 is sealed by a frangible diaphragm 59 threaded in and with the threads sealed by electron beam welding. Another frangible diaphragm 61 seals the inverted neck 56. The mounting for this diaphragm is interiorly threaded and an apertured insert 62 is tightened down against the diaphragm 61. The insert backs up the frangible diaphragm so that internal pressure within the gas reservoir will not rupture it, but a moderate increase in pressure within the gas generator above that in the reservoir will cause rupture.

To activate the gas supply system illustrated in FIG. 5, electrical initiators 63 are fired for igniting the propellant in the pyrotechnic generator. This builds up pressure in the axial gas flow passage 52 and ruptures the frangible diaphragm 61. This in turn causes a buildup in pressure in the gas storage reservoir rupturing the diaphragm 59 which permits gas to flow to the passenger restraint bag. Hot gas from the gas generator jetting through the aperture in the insert 62 mixes thoroughly with the cooler gas in the reservoir 54 and avoids need for an external plenum.

Although it is not deemed necessary, rupture of the diaphragms 61 and 59 can be initiated by explosive detonators which cause rupture by a sharp pressure pulse rather than using the pressure buildup from pyrotechnic gas generation. Such initiating rupture of the downstream frangible diaphragm 59 may be desirable, for example, where it is desired to inflate the passenger restraint bag to a somewhat lower level than if both the storage gas and pyrotechnic gas were employed.

FIG. 6 illustrates another embodiment of pyrotechnic device suitable for a hybrid gas generation system. The embodiment in FIG. 6 has a cylindrical pressure resistant housing 66 having a male thread 67 at one end for connection to a pressurized gas storage vessel (not shown). Male threads 68 are provided at the opposite end for connection to a manifold for inflating the passenger restraint bag. An axial gas flow passage 69 extends along the length of the housing. Two or more diagonally extending passages 71 are drilled through the wall of the housing to communicate with the axial gas flow passage 69.

A conventional pyrotechnic generator 72 having an electrical initiator 73 at the end is threaded into each diagonal passage. Such generators, which are commercially available, generate extremely high temperature gas with only minimal volume. Typically, they may contain a mixture of potassium perchlorate and aluminum powder which reacts energetically but without excess gas. Hot combustion products are ejected through the diagonal passages 71 into the axial gas flow passage 69. In there the combustion products mix with cool gas expanding from a pressurized gas reservoir and provide heating of that gas without contributing an additional substantial quantity of gas. The principal purpose of the generator 72 is to provide energy to overcome the adiabatic cooling. If desired, of course, gas generators producing more substantial volumes of gas at somewhat lower temperatures may also be employed.

FIG. 7 illustrates a conventional passenger restraint system for an automobile with a hybrid gas supply system exploded therefrom. This fragmentary drawing illustrates connection of the embodiment of FIG. 1 in the system. Prior to inflation the passenger restraint bag (hidden in FIG. 7) is folded into a mounting tray 74 seen from its back side. The hidden face of the tray may be left open or covered with an ejectible or frangible cover for protecting the bag. An aperture 76 in the back of the tray is in fluid communication with the interior of the bag, ordinarily through a perforated gas distributor tube (not shown) within the tray.

In a typical embodiment for the right front passenger seat of an automobile the storage tray is about 6 inches wide and 27 inches long with a depth of about 2½ inches. Preferably to minimize problems behind the automobile dash the gas supply is mounted directly behind the support tray with a width and length no greater than that of the tray, and clearly it is desirable to have a minimum volume. In the illustrated arrangement this is accomplished by having an elbow 77 connectable to the orifice 76 and to the outlet from the gas generator 16. The gas storage reservoir 10 is connected in series with the gas generator so that gas flows through it and the elbow into the interior of the inflatable bag. Such a serial arrangement permits a minimum volume hybrid gas supply system.

FIG. 8 illustrates a slightly different embodiment of hybrid gas supply system serially connectable to an inflation bag. As illustrated in this embodiment a gas generator 78 has an outlet connected by a U-shaped conduit 79 to a pressurized gas storage reservoir 81. Such a reservoir can, for example, be like the gas storage reservoir 54 hereinabove described and illustrated in FIG. 5, with both ends sealed by frangible diaphragms. The gas generator 78 can be quite simple with a single elongated cavity having a gas generator grain therein. A double elbow conduit 82 is connected to the outlet of the gas reservoir 81 so that the supply can be connected to a central aperture in a bag stowage tray (not shown) with the generator 78 and reservoir 81 lying parallel to the back side thereof. It will be appreciated that the serially connected gas generator and gas reservoir in this embodiment fit closely against the bag inflation system and occupy a minimum volume.

Although limited embodiments of gas generator and hybrid gas system for inflating automobile passenger restraint bags have been described and illustrated herein, many modifications and variations will be apparent. Thus, for example, other gas flow paths between cavities within the compact pyrotechnic gas generator can be devised. Thus, for example, the several pyrotechnic cavities can be connected by a pyrotechnic ignition train so that only a single electrical initiator is used in the gas generator. Similarly, additional gas flow paths from the cavities to the gas flow passage can be provided. Likewise variations can be made in the storage reservoir, such as having an inverted neck with female thread at each end for use in an embodiment like that of FIG. 5. This further reduces the overall length of this combination. The serially connected gas generator and gas reservoir provided in FIG. 8 can be switched so that gas flows from the latter through the former. Many other modifications and variations will be apparent to one skilled in the art and it is therefore to be understood that within the scope of the appended claims, the invention may be practiced otherwise than as specifically described.

What is claimed is:

1. A hybrid gas supply system for inflating an automobile passenger restraint bag comprising:
    a cylindrical high pressure gas storage reservoir;
    an axial gas flow orifice in one end of the gas reservoir;
    a frangible diaphragm sealing the gas flow orifice;
    a pyrotechnic gas generator external to the gas reservoir;
    an axial gas flow passage in the gas generator;
    connection means for interconnecting the gas generator and the gas reservoir with the axial passage coaxial with the gas flow orifice and isolated from the high pressure gas by the infrangible diaphragm; and
    an explosive detonator in the axial gas flow passage external to the gas storage reservoir and adjacent the frangible diaphragm for bursting the diaphragm upon receipt of an electrical signal; and wherein
    the gas storage reservoir includes an inverted neck extending from an end towards the interior of the reservoir, the frangible diaphragm being within the inverted neck, and wherein the connection means includes a female connector moiety within the inverted neck and a male connector moiety on the gas generator.

2. A system as defined in claim 1 wherein the exterior of the gas generator has substantially the same transverse cross section as the cylindrical gas reservoir.

3. A hybrid gas supply system for inflating an automobile passenger restraint bag comprising:
    a cylindrical high pressure gas storage reservoir;
    an axial gas flow orifice in one end of the gas reservoir;
    a frangible diaphragm sealing the gas flow orifice;
    a pyrotechnic gas generator external to the gas reservoir having a generally square transverse cross section with chamfered corners comprising:
       an axial gas flow passage;
       a plurality of pyrotechnic receiving cavities in the housing spaced around the axial passage;
       a pyrotechnic composition in each of the cavities for generating gas upon ignition thereof;
       an electrical initiator in one end of a first one of the cavities;
       passage means for conveying gas from the first cavity to a second one of the cavities;
       duct means for conveying gas from the second cavity to the axial gas flow passage; and
       frangible means for sealing the duct means; and wherein
       the first and second cavities are in adjacent corners of the gas generator parallel to the axial flow passage, and third and fourth cavities similar to the first and second cavities are in the other two corners; and
    connection means for interconnecting the gas generator and the gas reservoir with the axial passage coaxial with the gas flow orifice and isolated from the high pressure gas by the frangible diaphragm.

4. A pyrotechnic gas generator comprising:
    a pressure resistant housing;
    mechanical connector means at one end of the housing for fluid tight connection to a gas supply;
    mechanical connector means at the other end of the housing for fluid tight connection to an inflation system;

an axial gas flow passage between the mechanical connectors;

a plurality of pyrotechnic containing cavities spaced around the axial gas flow passage;

a transverse duct from at least one of the cavities to the axial gas flow passage;

means for temporarily sealing the transverse duct;

an electrical initiator in one end of a first one of the cavities; and a first transverse gas flow passage from the other end of the first cavity to an end of a second one of the cavities; and wherein the transverse duct is from the other end of the second cavity to the axial gas flow passage.

5. A pyrotechnic gas generator as defined in claim 4 wherein the housing has a generally square transverse cross section with chamfered corners and wherein the first and second cavities are in adjacent corners of the housing parallel to the axial gas flow passage, and third and fourth cavities similar to the first and second cavities are in the other two corners.

6. A pyrotechnic gas generator as defined in claim 4 further comprising an explosive detonator in the axial gas flow passage adjacent the connector means at the end thereof for connection to a gas supply.

* * * * *